Dec. 14, 1971     H. W. KOCH     3,626,565
CAGE AND ROLLER METHOD
Filed Nov. 10, 1970     4 Sheets-Sheet 1
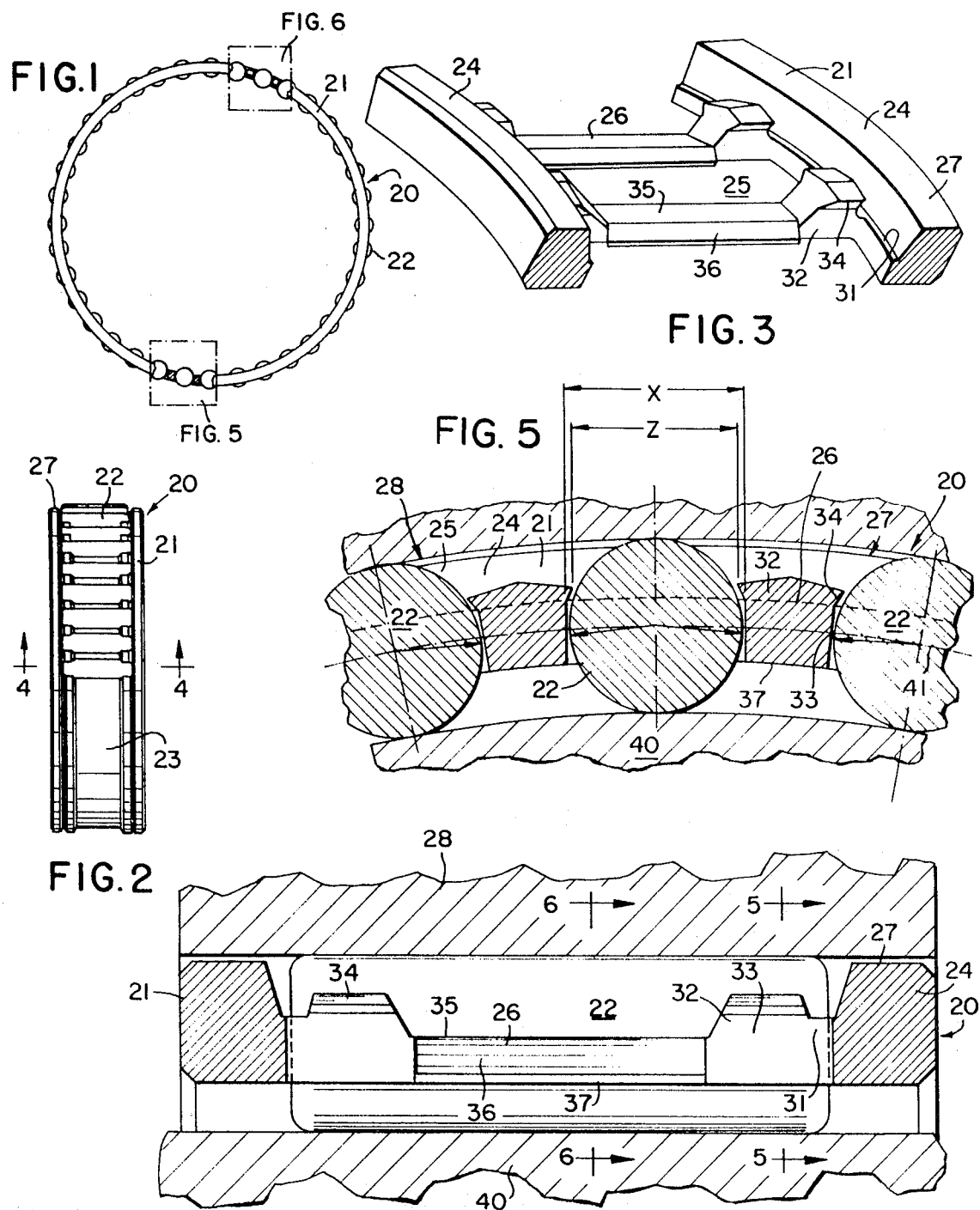

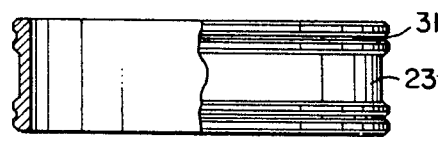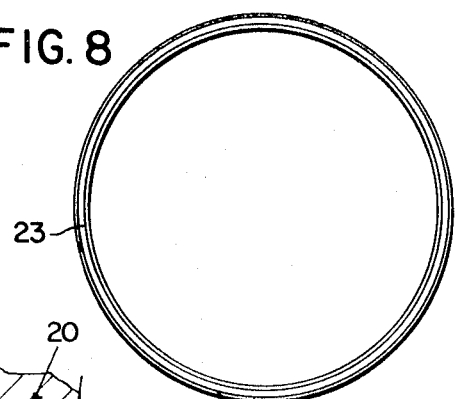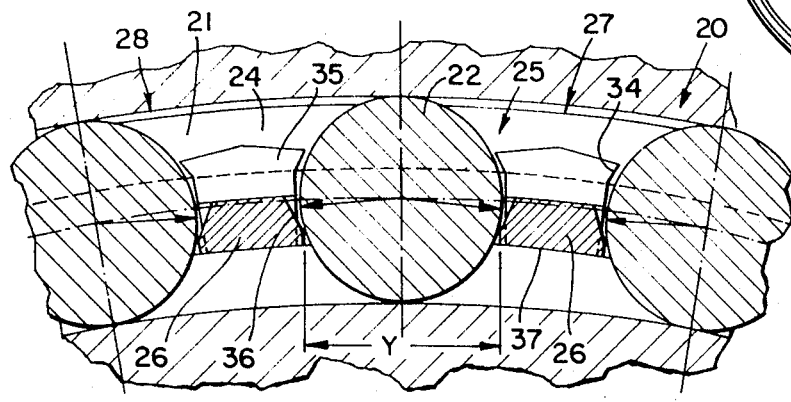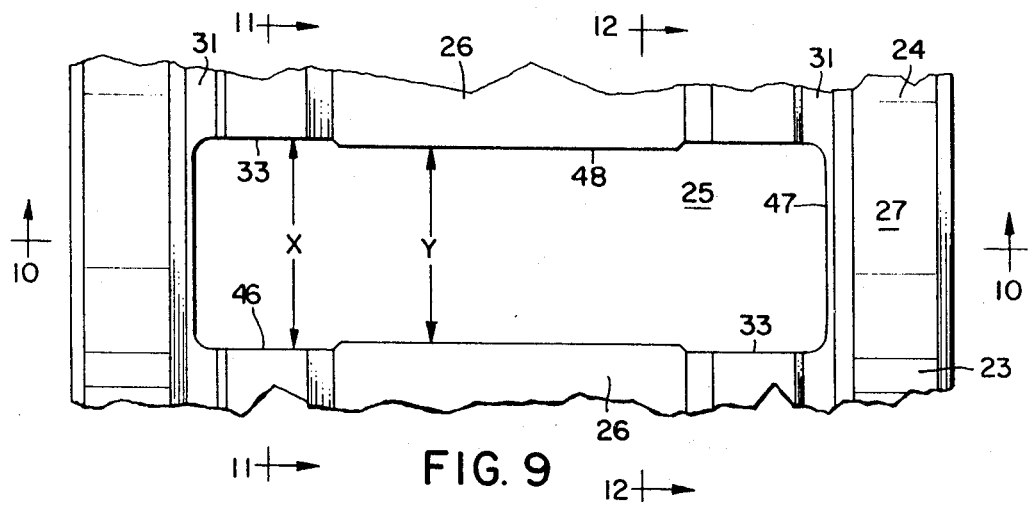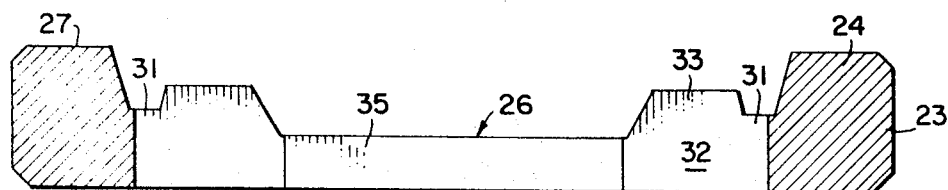

Dec. 14, 1971  H. W. KOCH  3,626,565

CAGE AND ROLLER METHOD

Filed Nov. 10, 1970  4 Sheets-Sheet 3

INVENTOR.
HANS KOCH

BY Jackson, Jackson, & Chovanes

ATTORNEYS.

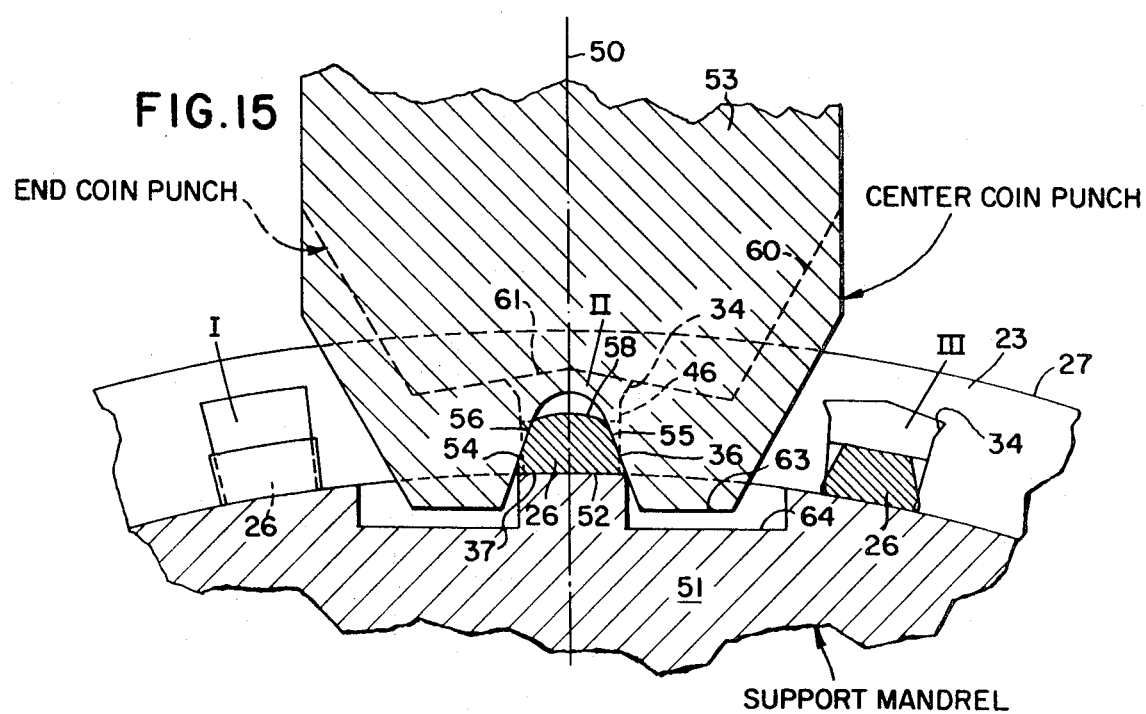
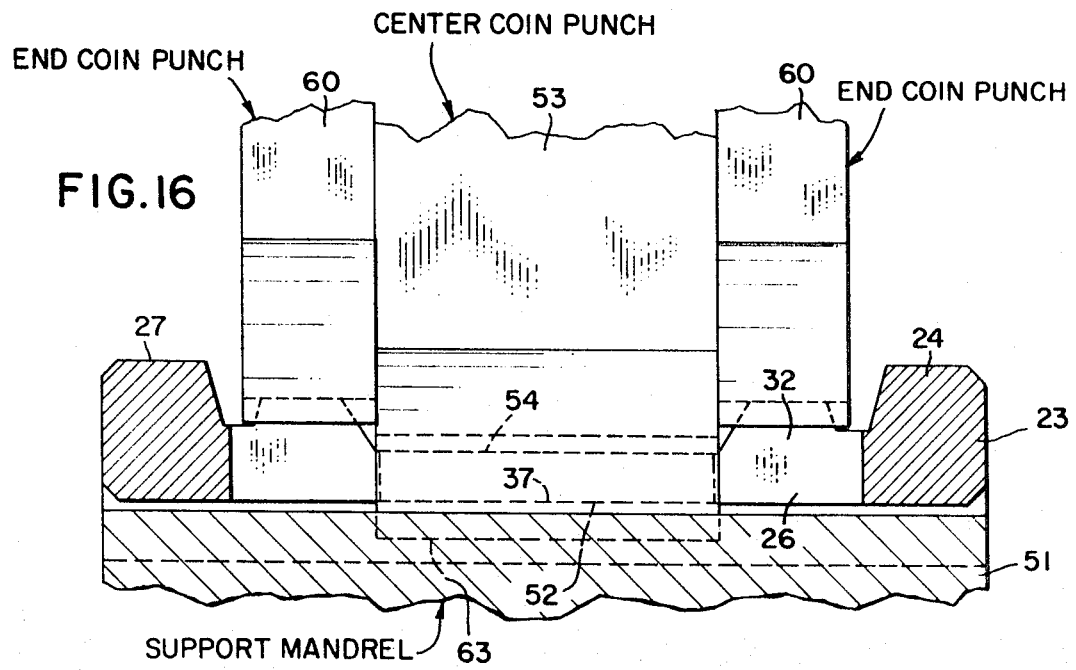

United States Patent Office 3,626,565
Patented Dec. 14, 1971

3,626,565
CAGE AND ROLLER METHOD
Hans W. Koch, Levittown, Pa., assignor to Roller Bearing
Company of America, West Trenton, N.J.
Original application Nov. 24, 1969, Ser. No. 879,352.
Divided and this application Nov. 10, 1970, Ser.
No. 88,373
Int. Cl. B21d 53/12
U.S. Cl. 29—148.4 C    4 Claims

ABSTRACT OF THE DISCLOSURE

In cage and roller combinations suitable for operation between inner and outer members to form a bearing, a cage guided on its outside diameter is produced by forming a blank having thickened rim portions at the ends, relieved relatively thin portions inwardly of the rim portions, thickened guiding portions and outward retaining portions inwardly of the relieved portions and a relatively thin mid-length portion, then punching windows with parallel sides from the mid-length portion, the guiding and outward retaining portion and the relieved portion but not entering the rim portions, the windows being relatively wide at the ends and relatively narrow at the middle, and then coining the crossbars desirably simultaneously to form lips at the guiding and outward retaining portions near the outside while retaining parallel sides at the guiding portions near the pitch diameter, and to displace metal from the mid-length portions so as to form inwardly converging side walls which will clear the rollers and prevent escape of the rollers inwardly. The invention may provide cage and roller combinations in which a single roller in a window is guided adjoining the pitch circle near the end, the guiding portion outwardly converges to retain the roller against outward motion, and the window at the end terminates short of the rims.

DISCLOSURE OF THE INVENTION

The present application is a divisional of my co-pending application Ser. No. 879,352, filed Nov. 24, 1969 for Cage and Roller Combination and Method.

The present invention relates to roller and cage combinations of the character which are intended to operate between a hardened shaft on the inside, and the interior or bell portion of a hardened shaft at the outside, or in a bearing outer race or recess at the outside. The cage and roller combinations of the character under discussion are extensively used in vehicle transmissions and as connecting rod bearings in internal combustion engines. It will be understood that the cage may be interrupted as for insertion around a crankshaft.

A purpose of the invention is to greatly improve the tool life in making steel cages for roller and cage combinations by eliminating off-center shaving operations which have formerly been necessary.

A further purpose is to make it possible to produce roller and cage combinations having thick machined cages using metals which are stronger and more wear resistant than aluminum and particularly to permit the production of such cages from steel. By this technique the tendency of windows to open up and release rollers which has been encountered in aluminum cages is prevented.

A further purpose is to permit the manufacture of a cage for a roller and cage combination by greatly reducing the amount of metal thickness through which punching must occur, particularly adjacent the ends of the punches, and thus greatly reducing wear on the punch curved end portions.

A further purpose is to avoid the tendency which has previously existed to twist the cage crossbars by conducting punching and shaving operations in a direction other than along the radial direction with respect to the cage.

A further purpose is to accomplish guiding at the pitch circle and avoid any tendency to cam the rollers out of the cage by virtue of the guiding on a coined surface.

A further purpose is to form a window with parallel sides, wide at the ends and narrow toward the mid-length area, and to coin the crossbars between the windows near the ends in the radial direction from the center of the crossbars so as to form outer retaining lips at the ends and so as to displace metal at the mid-length portion to permit the roller to seat and be retained.

A further purpose is to avoid a tendency to rock the crossbar under the shaving action so as to make the roller tend to bind in the window at one side of the crossbar and tend to be loose in the window at the other side of the crossbar, and to make the retention inside and outside by the crossbars more uniform on all windows.

Further purposes appear in the specification and in the claims.

In the drawings I have chosen to illustrate one only of the numerous embodiments in which the invention may appear, selecting the forms shown from the standpoints of convenience in illustration, satisfactory operation and clear demonstration of the principles involved.

FIG. 1 is an end elevation partly in section transverse to the bearing axis, illustrating a roller and cage combination of the invention.

FIG. 2 is a side elevation of the roller and cage combination of FIG. 1, showing half of the cage completely finished and the other half of the cage prior to punching of the windows.

FIG. 3 is a sectional perspective showing a portion of the finished cage of the invention.

FIG. 4 is an enlarged section through a bearing employing the roller and cage combination of the invention, the section being taken on the line 4—4 of FIG. 2.

FIG. 5 is a section on the line 5—5 of FIG. 4.

FIG. 6 is a section on the line 6—6 of FIG. 4.

FIG. 7 is a partially sectioned side elevation of the blank from which the cage has been manufactured in accordance with the invention.

FIG. 8 is an end elevation of the blank of FIG. 7.

FIG. 9 is a fragmentary outside view of the blank after punching the window and before coining.

FIG. 10 is a section on the line 10—10 of FIG. 9.

FIG. 15 is a diagrammatic progressive stepwise view, partly in section transverse to the bearing axis at the middle, illustrating in position I the blank prior to coining, showing in position II the coining operation with the tools engaging the blank and in position III showing the completed coined bar.

FIG. 16 is a section through the middle of the window showing a side view of the tools used in coining.

Figure 11:
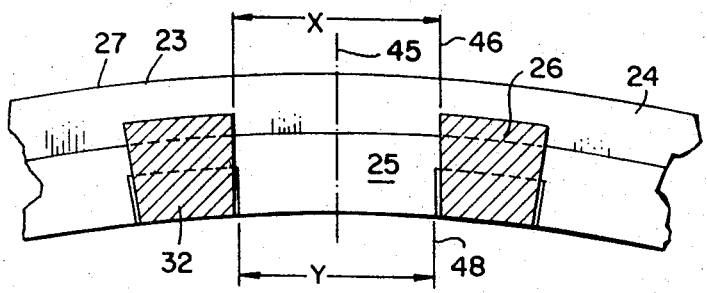
FIG. 11 is a section on the line 11—11 of FIG. 9.

Describing in illustration but not in limitation and referring to the drawings:

Many self-contained roller and cage units have been produced in the art.

Some of them use relatively soft materials in the form of die castings or the like and do not provide strong cages.

In some of the roller and cage units, the cage is made from a strip stock which has a thickness of only approximately 20% of the roller diameter so that the cage is lacking in strength and rigidity.

Other roller and cage units employ tubing which is pierced and coined by pressure rolling it to make the outside retention, leaving the crossbar toward the middle untouched with a relatively thin and inadequate thickness.

In other cage units which are pierced and coined from a machined blank, the coining leads to a guiding portion which is relatively far inward of the pitch circle, and either leads to roller guiding of the cage without guiding of the cage on the outside or cam action against the guiding surfaces tending to jam the roller or both difficulties.

In other self-contained cages which are made by piercing a machined blank, it is necessary to go through elaborate supplemental machining operations such as milling, broaching, shaving, or even grinding, which are both time consuming and uneconomical.

One procedure for making a self-contained cage for a roller and cage unit is to first pierce a machined blank and then shave it at an offset angle to the radial direction. This leads to rocking the crossbar at its transverse axis so that the window is open at one side of the bar and constricted at the other side of the bar, thus encouraging loss of retention at one side and binding at the other side, Heinrich Schmidt U.S. Pat. 3,163,477. Also the tool wear in producing this cage from steel is excessive, due to the heavy wall thickness needed and the offset direction of shaving.

Other efforts to solve this problem appear in Schaeffler U.S. Pat. No. 3,110,529 which has guidance provided near the interior of the crossbars by lips which tend to cam the roller outwardly when the cage leads and lags with respect to the motion of the roller. A further effort has been made to solve this problem in Einaudi U.S. Pat. No. 3,114,960 which has an extremely thin mid-length portion which permits one rim to twist with respect to the other. In this Einaudi cage the window is pierced through the thick section of the rim, thus drastically reducing tool life.

The present invention is designed to overcome these difficulties, making it possible to obtain a roller and cage combination with a steel cage, while obtaining long tool life.

In accordance with the invention, a suitably curved blank is employed, which has a thick section at the rims, a relieved portion immediately inside the rims at which the end of the pierced window is to be located, a thick section toward the middle at each side which is to provide guidance and outer retention, and a thin mid-section which is to provide inner retention.

The windows are punched by indexing the blank and forming parallel sides which are wide at the ends and relatively narrow at the mid-length portion. Subsequent to forming the windows, the crossbars are coined, preferably simultaneously at both the center and the ends, to form lips on the thickened guiding portions which will retain the roller at the outside when the cage is removed from the assembly, and to form inwardly converging walls at the mid-length portion which will retain the roller in the cage when the cage is outside the assembly.

In FIG. 1 I illustrate a roller and cage combination 20 consisting of a cage 21 and rollers 22 supported in the cage. The cage is capable of holding the rollers in position during transport, sale and installation, and also during removal for subsequent repair.

In FIG. 2 I illustrate a portion of the cage 21 provided with rollers 22 and also a portion of a blank 23 from which the cage has been made.

The construction of the cage will be better understood by reference to FIG. 3. At the opposite ends the cage 21 has rims 24, which may extend continuously where the bearing can be inserted endwise, or may be divided or interrupted for insertion around a shaft or the like as in the case of a connecting rod bearing. Toward the mid-length portion of the cage there are a plurality of windows 25, each of which is adapted to receive and retain one roller, and between the windows there are crossbars 26.

Each of the rims has a radially outward surface 27 which is intended to guide on a suitably hardened land of an outer tubular member 28, normally not supplied by the bearing manufacturer, as shown in FIG. 4.

Toward the mid-length portion at each end of the crossbar 26 there is an external recess opposite a reduced section 31, at which the window terminates endwise.

Further inward, toward the mid-length portion of the cage, there is a thickened guiding portion 32 at each end which is adapted to guide the rollers approximately opposite the pitch diameter as shown at 33. Radially outside of the pitch circle, at each side of the guiding portion 32 there are lips 34, protruding toward the opposite side of the window, which serve to retain the roller in place when the roller and cage combination is outside the assembled bearing.

Toward the mid-length portion of the crossbar 26, there is a relatively thin inner retaining portion 35 of the crossbar which has at the two sides outwardly converging side walls 36 which allow clearance for the roller when it is in operation and at the same time retain the roller in the cage when the combination is removed from the assembly.

It will be evident that in the preferred embodiment the interior of the crossbar and the rim forms a straight line axially as shown at 37, for example as shown in FIG. 10, the indentations in the contour being provided at the outside of the cage.

the cylinder 22 and top shoe 12 of FIG. 1 in applications

The rim itself is relatively quite thick and should have a thickness of between 60 and 95% of the roller diameter.

The reduced section 31 between the rim 24 and the guiding portion 32 which protects against excessive wear on the fillets at the ends of the punches, may be as thin as 35% of the roller diameter and as thick as 20% less than the thickness of the guiding portion 32.

The guiding portion 32 will have a thickness of between 55 and 95% of the roller diameter. The mid-length portion 35 should have a thickness of between 30 and 50% of the roller diameter.

In FIG. 4 the assembled roller and cage combination are operating between an outer member 28 and an inner shaft or the like 40, the intention being that the cage will guide on its outside diameter.

In FIG. 5 it will be evident that rollers 22 are illustrated in guiding relation at pitch circle 41 with the guiding surfaces 33 of the guiding portions 32, while the outer retaining lips 34 are extending inward to restrict the width of the window to somewhat less than the diameter of the roller, by a difference suitable to press the roller into position, which may be of the order of .004 to .015 inch (the total interference of the window) with a roller diameter of ¼ inch.

In normal operation of the roller and cage combination, the lips 34 should never contact the rollers, but if the roller and cage combination must be removed after assembly, then the lips 34 function to hold the rollers in place.

As shown in FIG. 6, which illustrates the shape of the mid-length portion 26 of the crossbar, the sides of the crossbar are relieved at 36 so that no contact should occur with the rollers during normal operation, but when the roller and cage combination are removed from the bearing, then there will be sufficient interference, suitably of the order of .004 to .015 of an inch (the total interference of the window) in a bearing having one-quarter inch roller diameter.

FIGS. 7 and 8 illustrate the blank 23 from which the cage is to be made. While the blank will in many cases preferably be made of steel, which may be used without heat treatment, or may for example be carburized after completion of the cage and before insertion of the rollers, the cage may be of a suitable nonferrous metal, including one of the copper base alloys or, if the stresses are low enough, it may be made of aluminum or plastic.

The cage is indexed to bring the middle of a window opening opposite the center radial line of punching, and the punch is operated as best shown by FIGS. 9 to 12 inclusive, moving it radially inward along center line 45 producing parallel sides of the window as suggested by lines 46 and 48. It will be noted that unlike the Schmidt process, previously described, no shaving in an angular direction is contemplated but merely radial punching or piercing.

Figure 12:
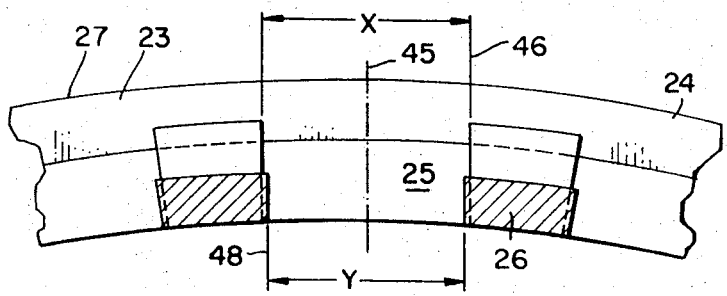
FIG. 12 is a section on the line 12—12 of FIG. 9.

To suggest that different dimensions are used at the two critical portions of the window, X in FIGS. 9, 11 and 12 suggests punching a wide window opening which begins at the end of the window in the reduced portion 31, thus conserving on the wear on the fillets at the ends of the punch, and Y suggests a somewhat narrower window opening opposite the mid-length section 26. It will be noted that unlike the Einaudi patent above referred to, the punching does not extend into the thick rim.

Thus, as shown in FIG. 9, a window 25 is produced which ends at 47 inwardly of the rim and in the reduced section 31, then there are relatively wide guiding walls 33 produced in the relatively thick guiding portion 32 near each end, and an initially straight sided relatively narrow portion 48 is produced in the mid-length portion 26.

The pierced side walls of the window are parallel to one another as shown in FIGS. 11 and 12.

Figure 14:
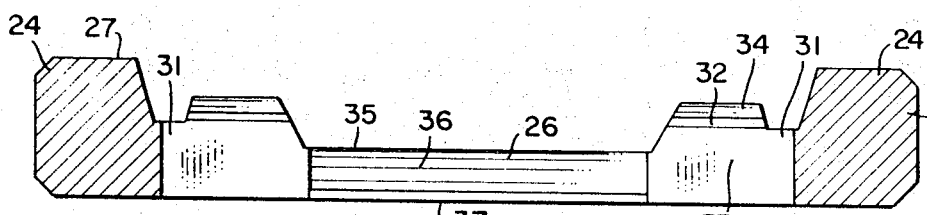
FIG. 14 is a section on the line 14—14 of FIG. 13.
Figure 13:
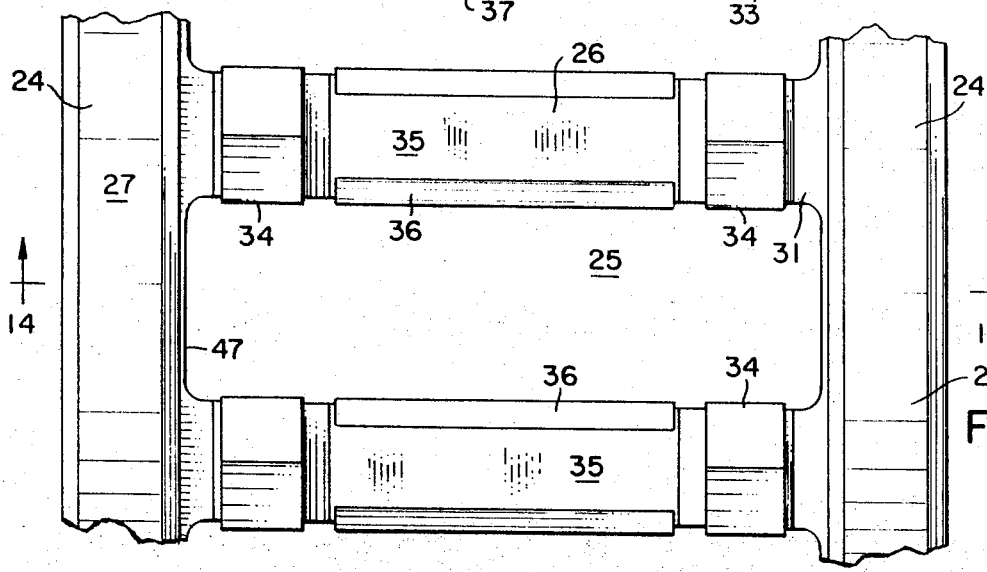
FIG. 13 is a fragmentary outside elevation showing the completed cage of the invention after coining.

The coining operation of the crossbar of the cage is shown in FIGS. 15 and 16, and the completed crossbar as coined prior to insertion of the rollers is shown in FIGS. 13 and 14. While it is most convenient to coin both parts of the crossbar at the same time, it will be evident of course that separate coining operations for the outside retaining lips and for the inner retaining portion can be used if desired. In any case, the crossbars are coined with the center of the crossbar at the tool axis.

FIG. 15 shows the radial axis of the coining punch, which is directly and centrally aligned with a backup mandrel or anvil 51 which has a crossbar supporting portion 52 which is immediately beneath the straight portion 37 at the inside of the crossbar and rim.

In full line in FIG. 15, a center coining punch 53 extends inwardly straddling the crossbar by a V-shaped recess 54 and having on either side of this recess diverging forming surfaces 55 which cause plastic deformation of metal at 56 which would otherwise interfere with the roller so that it forms an inclined surface 36 and moves some of the metal upward into a thickened portion 58. Thus the roller retention feature of the mid-length portion 26 of the crossbar with the roller at the two sides is retained and the mid-length section of the crossbar has increased depth of section and stiffness.

There is an end coining punch 60, preferably part of the punch 53, at each end, which has symmetrically placed at its forward end oppositely sloping forming portions 61 which encounter at the mid-line the outer end of the guiding and outside retaining portion 32, to spread the metal outward at the outside, forming retaining lips 34, while at the same time leaving unimpaired the clearance along the punched or pierced walls 46 which engage the sides of the roller at approximately the pitch circle. The clearance between the lips 34 is shown at Z in FIG. 5.

Thus, the tolerance on the width of the window which is the roller diameter plus the clearance between the window and the roller, as established by the initial punching or piercing, is retained unimpaired by the coining, the lip 34 merely being relied upon to retain the rollers in the cage when the cage is not functioning in the assembly.

It will be evident that the forward ends 63 of the center coining punch 53 at either side of the crossbar enter relieved portions 64 in the mandrel 51.

Thus by reference to FIG. 15, it will be seen that at position I the crossbar is shown prior to coining, at position II the crossbar is shown at the completion of the simultaneous coining operations, while in position III the crossbar is shown after coining and removal of the coining punch.

As a consequence the finished cage, as shown in FIGS. 13 and 14, has lips 34 which can be elastically deflected to press in the roller from the outside and then will hold the roller against escape from the outside and has inwardly converging walls 36 whose total clearance is sufficiently less than the roller diameter so that the roller will not escape radially inwardly.

It will be evident that the invention provides a self-contained unit consisting of a cage and its rollers which can be sold and installed as such, economizing on radial space as compared to a bearing having inner and outer races, and allowing the machinery manufacturer to incorporate the inner and outer race functions in components which will be used also for other purposes.

It will be evident that the dimension which was created by piercing and which is unchanged and provides the guiding contact near the pitch line, must allow for the space occupied by the roller and sufficient clearance for proper operation of the cage with respect to the roller in circumferential and radial motion of the cage and roller.

It will be evident that the design of the crossbar is such that the cage is capable of functioning under heavy duty, and yet flexible enough to permit insertion or if necessary removal of individual rollers as required. The thickness is adequate to provide suitable strength, but still is reduced where practical so as to minimize the wear on the tools. This would be especially a problem if one were to pierce into the rim of a heavy-walled cage. The ends of the window terminate in the relief groove and not in the rim of the cage.

In view of my invention and disclosure, variations and modifications to meet individual whim or particular need will doubtless become evident to others skilled in the art, to obtain all or part of the benefits of my invention without copying the method shown, and I therefore claim all such insofar as they fall within the reasonable spirit and scope of my claims.

Having thus described my invention, what I claim as new and desire to secure by Letters Patent is:

1. A method of producing a cage for rollers which comprises forming a blank with relatively thick rims at the sides, relatively thick guiding portions inwardly of the rims, intervening end portions of reduced section between the guiding portions and the rim and a relatively thin mid-length portion, indexing the blank to the center line of the punch and punching windows from the blank which have parallel sides, which terminate at the ends in the end portions of reduced section inward of the rims, which are relatively wide at the guiding portions and which are relatively narrow at the thin mid-length portion, coining the blank in the guiding portions to cause metal to form converging lips which narrow the window at the outside while retaining the parallel sides of the window opposite the pitch circle, and coining the mid-length portions of the crossbar to form side walls of the window which converge inwardly to clear from the roller and which prevent escape of the roller.

2. A method of claim 1, which comprises coining the parts of each crossbar simultaneously.

3. A method of making a metallic cage for rollers, starting with a curved blank, which comprises forming the cross section of the blank with relatively thick rims at the edges, an axially straight interior between the rims, longitudinally extending relieved portions inwardly of the rims, relatively thick guiding and outwardly retaining portions inwardly of the relieved portions and a relatively thin mid-length portion, punching the blank with the blank indexed to the center line of the punch to create a succession of windows having parallel side walls, the windows extending into the relieved portion and terminating therein and not entering the rims, the windows being relatively wide at the guiding and outwardly retaining portions and relatively narrow at the mid-length portion, coining the crossbars between the windows on the center line of the punch, to cause plastic deformation on the upper portions of the sides of the guiding and outer retaining portions to produce outward retaining lips at such locations and coining the mid-length portions of the crossbars to create inwardly diverging side walls of the crossbars which will retain a roller against moving inwardly.

4. A process of claim 3, which comprises coining the parts of each crossbar simultaneously.

References Cited

UNITED STATES PATENTS

| | | | |
|---|---|---|---|
| 3,110,529 | 11/1963 | Schaeffler | 308—217 |
| 3,114,960 | 12/1963 | Einaudi | 29—148.4 C |
| 3,163,477 | 12/1964 | Schmidt | 308—217 |

THOMAS H. EAGER, Primary Examiner

U.S. Cl. X.R.

308—217